United States Patent
Choi

(10) Patent No.: US 7,715,203 B2
(45) Date of Patent: May 11, 2010

(54) RF MODULE STRUCTURE OF A MOBILE COMMUNICATION TERMINAL

(75) Inventor: Cheal-Hoon Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 843 days.

(21) Appl. No.: 11/026,080

(22) Filed: Dec. 30, 2004

(65) Prior Publication Data

US 2005/0143122 A1   Jun. 30, 2005

(30) Foreign Application Priority Data

Dec. 30, 2003   (KR) .................. 10-2003-0100748

(51) Int. Cl.
H05K 1/18 (2006.01)

(52) U.S. Cl. .................. 361/760; 361/761; 361/763; 438/107

(58) Field of Classification Search .......... 455/550.1; 361/760–761, 763–764, 803, 816, 818, 766, 361/782–783, 794–795, 811, 823, 800, 777, 361/778, 820; 438/106, 107, 109; 174/260, 174/261

See application file for complete search history.

(56) References Cited

U.S. PATENT DOCUMENTS

| | | | | |
|---|---|---|---|---|
| 5,414,214 A | * | 5/1995 | Cho et al. | 174/539 |
| 5,587,885 A | * | 12/1996 | Swamy | 361/777 |
| 5,703,753 A | * | 12/1997 | Mok | 361/715 |
| 5,949,654 A | * | 9/1999 | Fukuoka | 361/760 |
| 5,978,880 A | * | 11/1999 | Bruce et al. | 710/316 |
| 6,050,476 A | * | 4/2000 | Yokoyama et al. | 228/115 |
| 6,159,767 A | * | 12/2000 | Eichelberger | 438/107 |
| 6,744,126 B1 | * | 6/2004 | Chiang | 257/686 |
| 6,885,561 B1 | * | 4/2005 | Hashemi et al. | 361/760 |
| 6,897,855 B1 | * | 5/2005 | Matthies et al. | 345/204 |
| 7,186,119 B2 | * | 3/2007 | Perugini | 439/66 |
| 7,394,268 B2 | * | 7/2008 | Bertin et al. | 324/754 |
| 2002/0049042 A1 | | 4/2002 | Oida | |
| 2002/0079559 A1 | * | 6/2002 | Ferstl et al. | 257/666 |
| 2004/0135250 A1 | * | 7/2004 | Hung | 257/738 |
| 2004/0201647 A1 | * | 10/2004 | Pulver et al. | 347/54 |

FOREIGN PATENT DOCUMENTS

| | | |
|---|---|---|
| CN | 1296642 | 5/2001 |
| CN | 1324168 | 11/2001 |
| CN | 1339175 | 3/2002 |
| CN | 2629355 | 7/2004 |
| JP | 2001-177433 | 6/2001 |
| KR | 1020020006055 A | 1/2002 |
| WO | 00/45420 | 8/2000 |

* cited by examiner

*Primary Examiner*—Duc Nguyen
*Assistant Examiner*—Dominic E Rego
(74) *Attorney, Agent, or Firm*—Lee, Hong, Degerman, Kang & Waimey

(57) ABSTRACT

An apparatus is disclosed for a module structure of a mobile communication terminal. The module structure comprises a radio frequency portion for processing communicated radio frequency signals, and a base-band portion commonly used by the radio frequency portion for providing modular replacement of a radio frequency multi-chip module connected to the radio frequency portion. The radio frequency multi-chip module is selected in accordance with a corresponding frequency band of the mobile communication terminal.

9 Claims, 2 Drawing Sheets

Lead Free Type

Lead Type

Connector Type

RF MODULE STRUCTURE OF A MOBILE COMMUNICATION TERMINAL

CROSS-REFERENCE TO RELATED APPLICATIONS

Pursuant to 35 U.S.C. §119(a), this application claims the benefit of the earlier filing date and right of priority to Korean Application No. 10-2003-0100748, filed on Dec. 30, 2003, the contents of which are hereby incorporated by reference herein in its entirety.

BACKGROUND OF THE INVENTION

1. Field of the Invention

The present invention relates to a structure having a radio frequency multi-chip module that is replaceable from the RF portion of a mobile communication terminal.

2. Description of the Related Art

FIG. 1 is a block diagram of a general mobile communication terminal.

Referring to FIG. 1, a mobile communication terminal includes a radio frequency (RF) system 10, a base-band system 20, and a peripheral device 30.

The RF system 10 provides an antenna, a transmission unit, a reception unit and a local oscillator (LO). The base-band system 20 has a mobile station modem (MSM) chip corresponding to a central processing unit (CPU) of a computer. The base-band system also provides a memory and peripheral devices.

The peripheral device 30 provides a user with an output signal of the base-band system 20 or transmits a signal inputted by a user to the base-band system 20. The peripheral device 30 generally includes a speaker, a microphone, a keypad, a liquid crystal display (LCD), a camera or the like.

For miniaturizing size and improving transmission and/or reception performance of a mobile terminal through elimination of signal interference, the RF system 10 and the base-band system 20, in the conventional art, are integrated on a single board.

If an RF frequency band, such as PCS, CDMA, AMPS, of the RF system changes, the RF system needs to be re-designed. Consequently, the conventional art has a disadvantage that the board requires redesign when the RF frequency band changes even though the base-band chip set remains the same. Therefore, there is a need for a system that overcomes the above problem and provides advantages over other integrated RF and base-band systems.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In one embodiment, a module structure of a mobile communication terminal is disclosed. The module structure comprises a radio frequency portion for processing communicated radio frequency signals, and a base-band portion commonly used by the radio frequency portion for providing modular replacement of a radio frequency multi-chip module connected to the radio frequency portion. The radio frequency multi-chip module is selected in accordance with a corresponding frequency band of the mobile communication terminal.

The RF multi-chip module may be implemented utilizing a lead free type of interconnection scheme with the base-band portion. The RF multi-chip module may, in another example, be implemented utilizing a lead type of electrical interconnection scheme with the base-band portion. In another exemplary example, the RF multi-chip module may be implemented utilizing a connector type of electrical interconnection scheme with the base-band portion.

The RF multi-chip module preferably comprises a board, a plurality of RF components mounted on the board, and a cap for isolating the RF components from the exterior environment from electrical interference signals. The board is preferably a ceramic laminated board.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The invention relates to a module structure having a radio frequency multi-chip module that may be modularly replaceable from the RF portion of the module structure for a mobile communication terminal.

Although the invention is illustrated with respect to a mobile terminal, it is contemplated that the invention may be utilized anywhere it is desired for packaging RF and base-band components within a single package. Reference will now be made in detail to the preferred embodiments of the present invention, examples of which are illustrated in the accompanying drawings.

The present invention provides an RF multi-chip module (MCM) with is part of a modularized RF portion of a mobile communication terminal. The RF portion is integrated, on the mobile terminal, with a base-band portion into one chip.

A base-band portion is commonly used with a chipset and a desired RF MCM is replaceably inserted thereto according to the frequency utilized in the specific area, so that a mobile communication terminal may be easily fabricated in a short period of time without the need for designing a new RF board.

Figure 1:
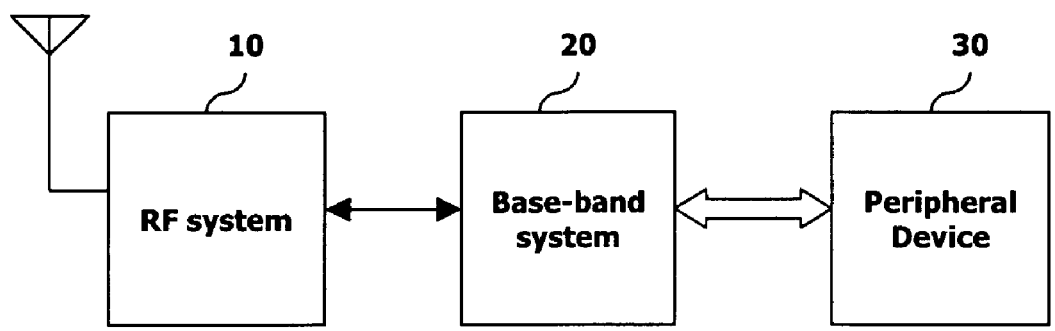
FIG. 1 is block diagram illustrating a conventional configuration of a mobile communication terminal.
Figure 2:
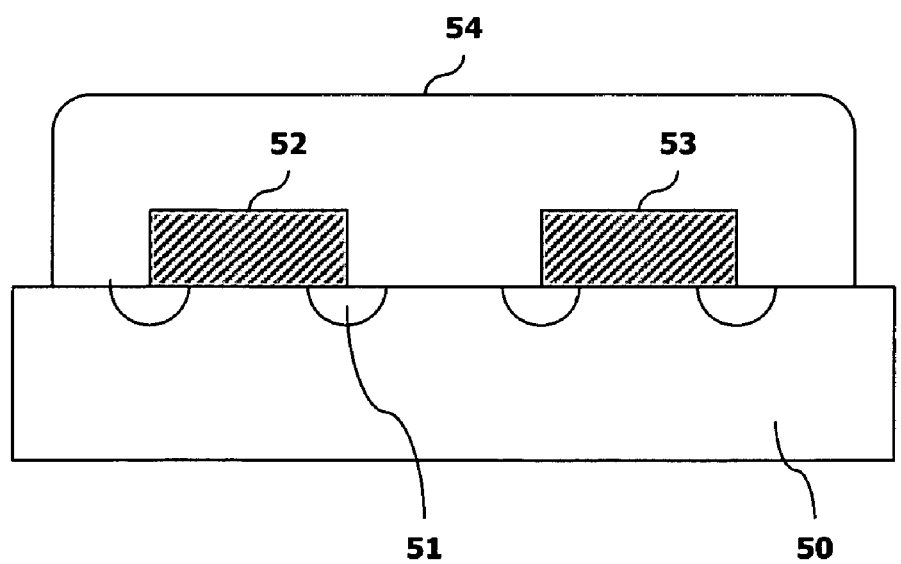
FIG. 2 is a cross-sectional view of an RF multi-chip module in accordance with an embodiment of the present invention.

FIG. 2 is a cross-sectional view of an RF MCM in accordance with an embodiment of the present invention. A plurality of wires are formed on an upper surface of a board 50 for allowing transfer of signals. A transmission unit 52 and a reception unit 53 are separately mounted on the board 50. A cap 54 provides signal isolation of the transmission unit 52 and the reception unit 53 from the exterior environment (not shown).

The board 50, for example, may be formed by a low temperature co-fired ceramic (LTCC) laminated board, a high co-fired ceramic (HTCC) laminated board, or a general FR-4 printed circuit board (PCB). The general FR-4 printed circuit board may be of a two-sided epoxy construction. The cap 30 is implemented, in one exemplary embodiment, utilizing an epoxy molding or, in yet another example, utilizing a metal shield.

The RF MCM in accordance with the present invention will now be described in detail.

The FR-4 is preferably utilized as the material for the multi-layer board 50 of the RF MCM. Wires 51 are mounted on a chip of the board 50. Wires 51 are utilized for separately mounting a transmission unit 52 and a reception unit 53 deposited on the board.

The board 50, in this exemplary example, is an LTCC. The LTCC is a ceramic board formed by laminating ceramic sheets. The LTCC having a dielectric nearly twice as high as that of FR-4 reduces board dimensionality and accordingly reduces the board size. Because the LTCC has a good heat conductivity, the heat generated, for example, by a power amplifier module (PAM) may be efficiently removed from the board 50. The reduced heating will reduce the temperature of the mobile terminal.

Figure 3:
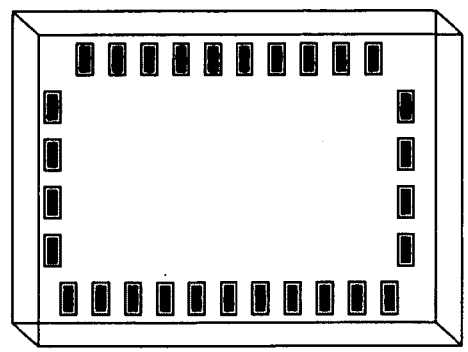
FIG. 3 is an RF package layout showing various types of connection terminals of a RF multi-chip module in accordance with an embodiment of the present invention.
Figure 3:
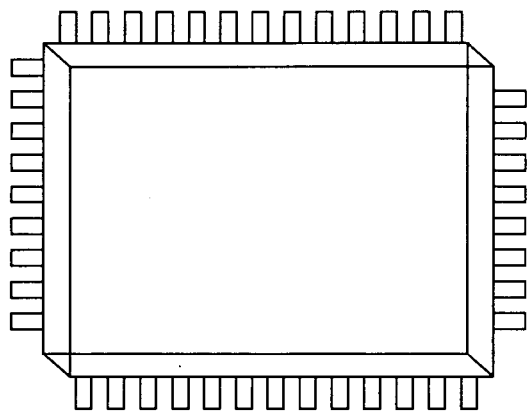
Figure 3:
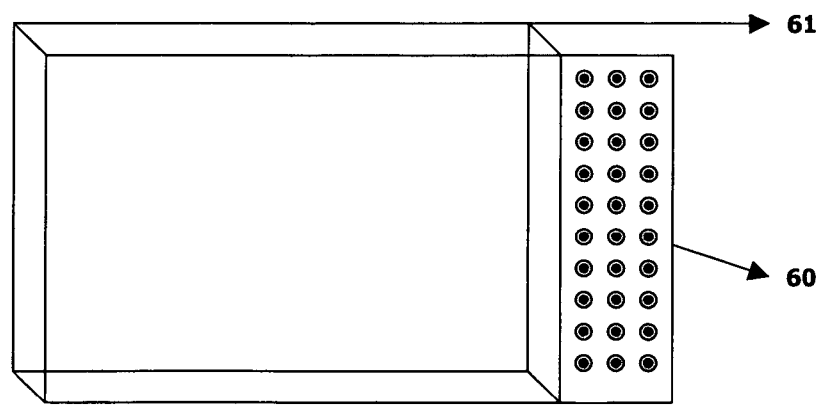

FIG. 3 is an RF package layout showing various connection terminals of an RF MCM in accordance with the present invention. The RF MCM maybe a lead free type or a leaded type in accordance with the type of pins used for electrical interconnections the mobile terminal. In one alternative, connectors may be used in place of pins. In one example, reference number 60 is a connector for a connector type RF MCM and reference number 61 is a cap.

An RF system may be implemented within an RF MCM through mounting the components on a board 50 using various mounting methods such as those described in the above FIG. 2. Operation of the RF MCM is the same as that of the RF system, and a board 50 may be utilized for the RF MCM using LTCC.

Each component, in this example, has a bare-die state and is wire-bonded to the LTCC during fabrication of an RF MCM. A transmission unit 52 and a reception unit 53 are positioned along the wires 51 of the board 50. Wire-bonding is utilized to complete fabrication of the RF MCM.

Components which have been previously modularized are soldered to the LTCC during fabrication of an RF MCM. In one example, a transmission unit 52 and a reception unit 53 being previously modularized are respectively positioned on the wires 51 and soldered to the LTCC during fabrication of an RF MCM.

The RF MCM is covered with a cap 54 to provide isolation from an exterior environment. The cap 54 of the RF MCM may fabricated either using an epoxy molding method like that of an IC package for covering the board. In another example, a shielded metal may be utilized to block unwanted wave interference to increase ESD protection and GNDing affects.

As so far described in the present invention, the RF portion is separately modularized in a mobile communication terminal. The base-band portion is commonly used by the RF portion. The RF module is replaced depending on the type of service provider, such as PCS, CDMA, Tri-Mode or the like. The replacement of the RF module provides a mobile terminal with smooth frequency transitions between various frequency bands.

In the present invention, an RF MCM obtained by separately modularizing an RF part eliminates the need for new circuits to be designed even in an area using a different frequency to readily reconfigure a mobile terminal in a short time period.

The present invention provides a reduced board size by fabricating an RF MCM using an LTCC board having a ceramic laminated board instead of with an FR-4 board. The LTCC board efficiently radiates heat generated within the board so that the overall temperature of the mobile terminal is reduced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

Although the present invention is described in the context of a mobile terminal, the present invention may also be used in any wired or wireless communication systems using mobile devices, such as PDAs and laptop computers equipped with wired and wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, etc.

What is claimed is:

1. A mobile communication terminal operable at a radio frequency band comprising:
    a modular radio frequency multi-chip module (RF MCM) comprising:
        a board;
        a plurality of radio frequency (RF) devices mounted on the board; and
        a cap for isolating the RF devices from the exterior environment for reducing electrical signal interference; and
    a base-band portion to which the RF MCM is interconnected,
    wherein the radio frequency multi-chip module is selected based on the frequency band and is replaceable such that the RF MCM can be replaced without replacing the base-band portion, and
    wherein either each of the RF devices comprises an exposed die portion such that the RF MCM is modularized via wire-bonding of the exposed die portion of each of the RF devices or each of the RF devices comprises a modular RF device such that the RF MCM is modularized via soldering of the modular RF device of each of the RF devices.

2. The mobile communication terminal of claim 1, wherein the radio frequency multi-chip module is interconnected utilizing a lead free type of interconnection.

3. The mobile communication terminal of claim 1, wherein the radio frequency multi-chip module is interconnected utilizing a lead type of electrical interconnection.

4. The mobile communication terminal of claim 1, wherein the radio frequency multi-chip module is interconnected utilizing a connector type of electrical interconnection.

5. The mobile communication terminal of claim 1, wherein the board is a ceramic laminated board.

6. The mobile communication terminal of claim 5, wherein the ceramic laminated board comprises multiple layers of an FR-4 type material.

7. The mobile communication terminal of claim 5, wherein the ceramic laminated board comprises a low temperature, co-fired ceramic material formed of laminated ceramic sheets.

8. The mobile communication terminal of claim 5, wherein the ceramic laminated board comprises a high temperature co-fired ceramic material formed of laminated ceramic sheets.

9. The mobile communication terminal of claim 1, wherein the cap is formed by one of an epoxy molding or a metal shield.

* * * * *